United States Patent
Allan et al.

(10) Patent No.: US 9,751,802 B2
(45) Date of Patent: Sep. 5, 2017

(54) HEAT TREATMENT FOR STRENGTHENING GLASSES

(75) Inventors: Douglas Clippinger Allan, Corning, NY (US); Adam James Ellison, Painted Post, NY (US); John Christopher Mauro, Corning, NY (US)

(73) Assignee: Corning Incorporated, Corning, NY (US)

( * ) Notice: Subject to any disclaimer, the term of this patent is extended or adjusted under 35 U.S.C. 154(b) by 78 days.

(21) Appl. No.: 13/992,925

(22) PCT Filed: Dec. 9, 2011

(86) PCT No.: PCT/US2011/064049
§ 371 (c)(1),
(2), (4) Date: Jun. 10, 2013

(87) PCT Pub. No.: WO2012/082528
PCT Pub. Date: Jun. 21, 2012

(65) Prior Publication Data
US 2013/0260154 A1    Oct. 3, 2013

Related U.S. Application Data

(60) Provisional application No. 61/422,812, filed on Dec. 14, 2010.

(51) Int. Cl.
*C03C 21/00* (2006.01)
*C03B 32/00* (2006.01)
(Continued)

(52) U.S. Cl.
CPC ............ *C03C 21/002* (2013.01); *C03B 32/00* (2013.01); *C03C 3/087* (2013.01); *C03C 3/091* (2013.01);
(Continued)

(58) Field of Classification Search
None
See application file for complete search history.

(56) References Cited

U.S. PATENT DOCUMENTS 3,524,737 A * 8/1970 Doyle et al. ................. 65/30.14
3,723,080 A   3/1973 Howell et al. ................... 65/30
(Continued)

FOREIGN PATENT DOCUMENTS

JP    54-83923       7/1979
WO    2007/032961    3/2007
(Continued)

OTHER PUBLICATIONS

International Searching Authority; International Search Report; Mailing Date: Sep. 4, 2012; pp. 1-6.
(Continued)

*Primary Examiner* — Lisa Herring
(74) *Attorney, Agent, or Firm* — Kevin M. Johnson

(57) ABSTRACT

A method of making a strengthened glass article. The method includes altering the glass structure and subsequently creating a compressive layer extending from the surface of the glass to a depth of layer. In some embodiments, the structure is altered by heat treating the glass at a temperature that is less than the annealing point of the glass, and the compressive layer is formed by ion exchange. A strengthened glass article made by the method is also provided.

13 Claims, 5 Drawing Sheets

(51) Int. Cl.
  *C03C 3/087*  (2006.01)
  *C03C 3/091*  (2006.01)
  *C03C 3/097*  (2006.01)
  *C03C 23/00*  (2006.01)
(52) U.S. Cl.
  CPC ............ *C03C 3/097* (2013.01); *C03C 23/007* (2013.01); *Y10T 428/315* (2015.01)

(56) References Cited

U.S. PATENT DOCUMENTS

| | | | |
|---|---|---|---|
| 3,853,674 | A | 12/1974 | Levene ............................. 161/1 |
| 2006/0216552 | A1 | 9/2006 | Ikenishi et al. ............ 428/846.9 |
| 2009/0100873 | A1* | 4/2009 | Allan ..................... C03B 17/064 65/85 |
| 2009/0197088 | A1* | 8/2009 | Murata ........................ 428/410 |
| 2009/0220761 | A1* | 9/2009 | Dejneka et al. ............. 428/220 |
| 2012/0085130 | A1* | 4/2012 | Hill ........................ C03B 25/08 65/30.14 |
| 2013/0026392 | A1 | 1/2013 | Jagannathan et al. |

FOREIGN PATENT DOCUMENTS

| | | |
|---|---|---|
| WO | 2008062662 | 5/2008 |
| WO | 2012048293 | 4/2012 |

OTHER PUBLICATIONS

JP2013544581 Office Action Dated Nov. 13, 2015.
Varshneya, "Chemical Strengthening of Glass: Lessons Learned and Yet to Be Learned," International Journal of Applied Glass Science, 1 [2] 131-142 (2010).
Varshneya, "The Physics of Chemical Strengthening of Glass: Room for a New View," Journal of Non-Crystalline Solids, 356 [44-49] 2289-2294 (2010).
English Translation of JP2013544581 Office Action Dated Apr. 5, 2016.

* cited by examiner

HEAT TREATMENT FOR STRENGTHENING GLASSES

CROSS-REFERENCE TO RELATED APPLICATIONS

This application claims the benefit of priority under 35 U.S.C. §119 of U.S. Provisional Application Ser. No. 61/422,812 filed on Dec. 14, 2010, the content of which is relied upon and incorporated herein by reference in its entirety.

BACKGROUND

The disclosure relates to glasses and glass articles having a damage resistant compressive surface layer. More particularly, the disclosure relates to methods of making such glass articles.

In many applications, glasses are chemically strengthened by ion exchange, which forms a compressive surface layer in the glass. This layer is resistant to the propagation of cracks that may arise, for example, due to impact.

SUMMARY

A method of making a strengthened glass article is provided. The method includes altering the glass structure and subsequently creating a compressive layer extending from the surface of the glass to a depth of layer. In some embodiments, the structure is altered by heat treating the glass at a temperature that is less than the annealing point of the glass, and the compressive layer is formed by ion exchange. A strengthened glass article made by the method is also provided.

Accordingly, one aspect of the disclosure is to provide a method of making a glass article having a surface that is under a compressive stress. The glass article has an annealing point and a fictive temperature that is greater than the annealing point. The method comprises: heating the glass article at a first temperature that is less than the annealing point of the glass article for a time period; and ion exchanging the heated glass article at a second temperature to achieve a compressive stress in the surface to a depth of layer, wherein the first temperature is greater than the second temperature.

A second aspect of the disclosure is to provide a method of strengthening a glass. The glass article has an annealing point and a fictive temperature that is greater than the annealing point. The method comprises: at least partially restructuring a surface of the glass at a temperature that is less than the annealing point; and creating a compressive layer in a surface of the glass after restructuring the surface.

Still another aspect of the disclosure is to provide a glass article having a surface under a compressive stress of at least 800 MPa, wherein the glass article is ion exchanged. The glass article has an annealing point and a fictive temperature that is greater than the annealing point.

Yet another aspect of the disclosure is to provide a glass article having a region extending from a surface of the glass to a depth of layer. The region is under a compressive stress of at least 800 MPa, and has a structure that differs from that of the remainder of the glass. The glass article has an annealing point and a fictive temperature that is greater than the annealing point.

These and other aspects, advantages, and salient features will become apparent from the following detailed description, the accompanying drawings, and the appended claims.

DETAILED DESCRIPTION

Figure 1:
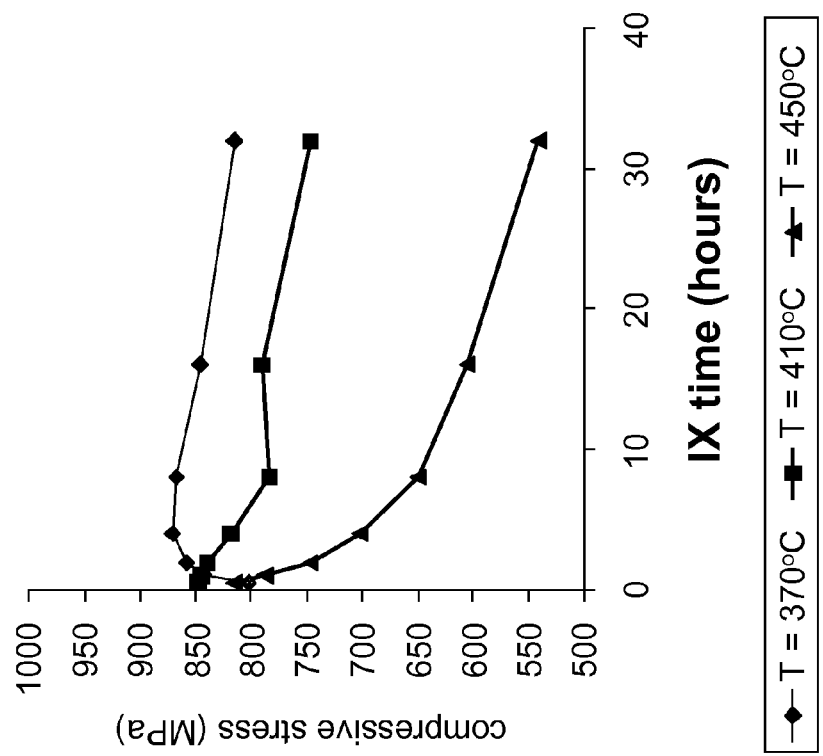
FIG. 1 is a plot of compressive stress for alkali aluminosilicate glass samples as a function of ion exchange time for different ion exchange temperatures.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," "an," and the corresponding definite article "the" mean "at least one" or "one or more," unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "glass transition temperature," "$T_g$," and "annealing point" refer to the temperatures at which the viscosity of the glass is in the range from about $10^{13}$ to about $10^{13.2}$ poise. Unless otherwise specified, these terms are equivalent and are used interchangeably herein.

As used herein, the term "fictive temperature" refers to the temperature at which at which the structural state of a glass would be in equilibrium were it heated or cooled very rapidly to that temperature. The fictive temperature is described in "Relation Between Inelastic Deformability and Thermal Expansion of Glass in its Annealing Range" by Arthur Q. Tool (Journal of the American Ceramic Society, vol. 29(9), pp. 240-253 (1946)): "The physicochemical condition or state of a glass is reasonably well known only when both the actual temperature and that other temperature at which the glass would be in equilibrium, if heated or cooled very rapidly to it, are known. This latter temperature has been termed the 'equilibrium or fictive temperature' of the glass." In this context, "actual temperature" means whatever the glass is experiencing now (e.g., ambient, ion exchange temperature, etc.) and the fictive temperature is the last temperature at which the glass was in equilibrium. As noted by Yue et al. (Journal of Chemical Physics, vol. 120(17) pp. 8053-8059 (2004)), higher cooling rates result in higher fictive temperatures.

In one aspect, methods of making a glass article and strengthening a glass are provided herein. In some embodiments, the method includes providing the glass article for processing by subsequent steps of the method. In some embodiments, the glass is formable by down-draw methods, such as slot draw or fusion draw methods known in the art. Here, the liquidus viscosity of the glass may be at least 130 kpoise (KP).

The glass article has an annealing point and a fictive temperature that is greater than the annealing point. The fictive temperature may be established by heating the glass at a temperature above its annealing point to equilibrate the glass and then rapidly cooling or quenching the glass at a rate of at least about 1° C./second. The glass or a glass article is either ion exchangeable or has been strengthened by ion exchange and comprises, in some embodiments, silica ($SiO_2$), aluminum, and sodium, with at least a portion of the latter two elements being present as the oxides alumina ($Al_2O_3$), and sodium oxide ($Na_2O$). In some embodiments, the glass is an alkali aluminosilicate glass or an alkali aluminoborosilicate glass. The ion exchangeable glass may further comprise phosphorus and alkaline earth metals.

In one embodiment, the glass article comprises an alkali aluminosilicate glass that comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio $$\frac{Al_2O_3 (mol\ \%) + B_2O_3 (mol\ \%)}{\Sigma\ alkali\ metal\ modifiers\ (mol\ \%)} > 1,$$

where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio $$\frac{Al_2O_3 (mol\ \%) + B_2O_3 (mol\ \%)}{\Sigma\ alkali\ metal\ modifiers\ (mol\ \%)} > 1,$$

where the modifiers are alkali metal oxides.

In another embodiment, the alkali aluminosilicate glass comprises, consists essentially of, or consists of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO.

In yet another embodiment, the alkali aluminosilicate glass comprises, consists essentially of, or consists of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤MgO+CaO≤10 mol %.

In still another embodiment, the alkali aluminosilicate glass comprises, consists essentially of, or consists of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol %≤$SiO_2$+$B_2O_3$+CaO≤69 mol %; $Na_2O+K_2O+B_2O_3$+MgO+CaO+SrO>10 mol %; 5 mol %≤MgO+CaO+SrO≤8 mol %; ($Na_2O+B_2O_3$)−$Al_2O_3$≤2 mol %; 2 mol %≤$Na_2O$−$Al_2O_3$≤6 mol %; and 4 mol %≤($Na_2O+K_2O$)−$Al_2O_3$≤10 mol %.

In other embodiments, the glass article comprises $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. In some embodiments, [($P_2O_5$ (mol %)+$R_2O$ (mol %))/$M_2O_3$ (mol %)]=1 and, in some embodiments, the glass does not include $B_2O_3$ and $M_2O_3$=$Al_2O_3$. The glass comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass may further comprise at least one alkaline earth metal oxide such as, but not limited to, MgO or CaO.

In some embodiments, the glass is free of lithium; i.e. the glass comprises less than 1 mol % $Li_2O$ and, in other embodiments, less that 0.1 mol % $Li_2O$. In some embodiments, such glasses are free of at least one of arsenic, antimony, and barium; i.e. the glass comprises less than 1 mol % and, in other embodiments, less than 0.1 mol % of $As_2O_3$, $Sb_2O_3$, and/or BaO.

In some embodiments, the methods described herein include a first step in which the structure of the glass is altered or restructured. As used herein, terms such as "altered" and "restructured" are considered equivalent terms and refer to treatments that cause an increase in the lattice dilation coefficient, density, and/or Young's modulus of the glass. While not wishing to be bound by any particular theory, the effect of such alterations in the glass structure is to create a shrinkage of the glass structure; i.e., to densify the glass.

In some embodiments, restructuring of the glass includes subjecting the glass to a heat treatment at a first temperature that is less than the annealing point of the glass. In some embodiments, the glass is heat treated at a first temperature that is in a range from about 25° C. to about 100° C. below the annealing point of the glass. In other embodiments, the first temperature is between the annealing point and the temperature at which the viscosity of the glass is $10^{17}$ poise (also referred to herein as the "$10^{17}$ poise temperature"). The heat treatment time is selected so as to result in an optimally high compressive stress in the glass. The glass may, in one embodiment, be heated at the temperature for times ranging from about 30 minutes (0.5 hour) to about four hours.

Following the heat treatment, a compressive layer (i.e., a layer that is under compressive stress (CS)) is created in a surface of the glass. In some embodiments, the compressive layer is formed by ion exchanging the glass at a temperature (second temperature) that is less than the temperature at which the glass is heat treated (first temperature), as described hereinabove.

Ion-exchange of an alkali metal containing glass replaces one or more kinds of alkali metal ions within the glass with one or more alkali metal ions from a source outside of the glass such as, but not limited to, a molten salt bath, a gel, a paste, or the like. In some embodiments, sodium or lithium within the glass is replaced by potassium (for lithium or sodium) or sodium (for lithium). Replacing a smaller alkali ion within the glass with a larger alkali ion results in a compressive force that is more or less parallel to the glass surface. The magnitude of the compressive stress diminishes away from the surface more or less in proportion to the local concentration of the larger alkali metal ion. If the glass object has opposing faces (e.g., a glass sheet), if both faces are subjected to ion exchange, and if the concentration profiles of the larger alkali metal ions are symmetric at and near the opposing faces of the glass, then force balance requires that the interior of the glass is under tension, with a maximum at or near the mid point between the opposing faces. The point in the interior of the glass where the imposed stress changes sign from compression to tension is referred to as the depth of the compressive layer (DOL). In one non-limiting example, a surface layer that is under compressive stress may be formed in a glass comprising sodium by immersing the glass in a molten salt bath that comprise a potassium salt (e.g., $KNO_3$). The larger potassium ions from the bath will replace sodium ions in the glass to a depth of layer, thereby creating a surface layer that is under compressive stress.

Both compressive stress and depth of layer provide a glass or glass article with damage resistance. When the surface of an ion-exchanged glass is subject to "insult" (e.g., impact, scratching, or the like), compressive stress at and near the surface of the glass keeps cracks produced by the insult from propagating to greater depths, thereby causing the glass to fragment catastrophically, whereas the depth of layer provides additional protection against larger insults. Ideally, it is desirable to have both at values as large as possible consistent with a suitable fragmentation style once a sufficiently grave insult is delivered. In most consumer electronics applications, it is desirable to keep the aggregate central tension below a level at which small particles with high kinetic energy would be released on glass failure.

If the glass article is formed by a down-draw process, the rate of stress relaxation during ion exchange works against obtaining a high compressive stress. It is sometimes possible to adjust the glass composition so as to obtain intrinsically higher levels of compressive stress, but there are several problems with this approach. For example, the compositional directions that lead to high compressive stress often lead to undesirable melting and forming attributes such as, for example, higher melting temperature, lower liquidus viscosity, and the like. It is therefore better to devise a means to manipulate the compressive stress obtained for a particular glass without changing its composition.

The structural states of as-made glass, particularly for down-drawn glasses, are not in equilibrium at temperatures at which ion exchange is typically carried out. Accordingly, in the absence of the structural alterations/restructuring described hereinabove, substantial structural relaxation—in the form of either viscous or stress relaxation—occurs during ion exchange. As a result of stress relaxation, ion exchange at elevated temperature to a fixed DOL invariably results in a lower CS than ion exchange to the same DOL performed at a lower temperature. Because the rate of ion exchange varies exponentially with the temperature of ion exchange, much longer times are required at lower temperatures to obtain the same DOL at low temperature than at high temperature. The rate of stress relaxation is substantially increased when the fictive temperature is high. Glass made by a down-draw process such as fusion draw or slot draw therefore tends to exhibit such large amounts of stress relaxation at conventional ion exchange temperatures that samples must be ion exchanged to a depth that is sufficient to provide adequate compressive stress. FIG. 1 is a plot of compressive stress for alkali aluminosilicate glass samples as a function of ion exchange time for different ion exchange temperatures. The amount of stress relaxation is accelerated at higher ion exchange temperatures. Such stress relaxation can be avoided by allowing the glass to structurally relax at the temperature at which ion exchange occurs. This, however, requires extremely long heating times at temperature. For example, a glass would have to be heated for approximately 4 million hours at 410° C. in order to fully equilibrate at this temperature.

When a rapidly quenched glass is annealed at its glass transition temperature ($T_g$) or annealing point, the compressive stress of the annealed glass will be greater than that of the rapidly quenched glass. These temperatures are similar and correspond to viscosities of approximately $10^{13}$-$10^{13.2}$ poise. At such viscosities, a rapidly quenched glass will structurally equilibrate in 1 to 2 hours. Ion exchange temperatures are typically 100-200° C. below the annealing point of an ion-exchangeable glass. The mismatch between the equilibrium temperature and the ion exchange temperature is therefore much less than that for the rapidly-quenched case. This results in much lower rates of stress relaxation, and thus much higher surface compressive stress for a given depth of layer. Annealing also reduces the rate of ion exchange at a give temperature, but the impact on compressive stress is so great that an equivalent depth of layer can be obtained in the same time with a modest increase in ion exchange temperature with very small penalty to the compressive stress advantage conferred by annealing.

The central disadvantage of annealing is that the same comparatively low viscosity that provides for 1 to 2 hour structural re-equilibration also can facilitate deformation of the glass. Without elaborate fixturing, for example, a sheet that is annealed vertically while resting on an edge will deform considerably. Likewise, a three-dimensional glass article made from thin sheet may warp or distort during the annealing process. For three-dimensional shapes in particular, a sub-$T_g$ heat treatment at temperatures between the annealing and strain points may be carried out to reduce internal stresses within a glass article; however, complete structural equilibration that would be equivalent to annealing for 1 to 2 hours at the annealing point would take days or weeks to occur at these lower temperatures.

Figure 2:
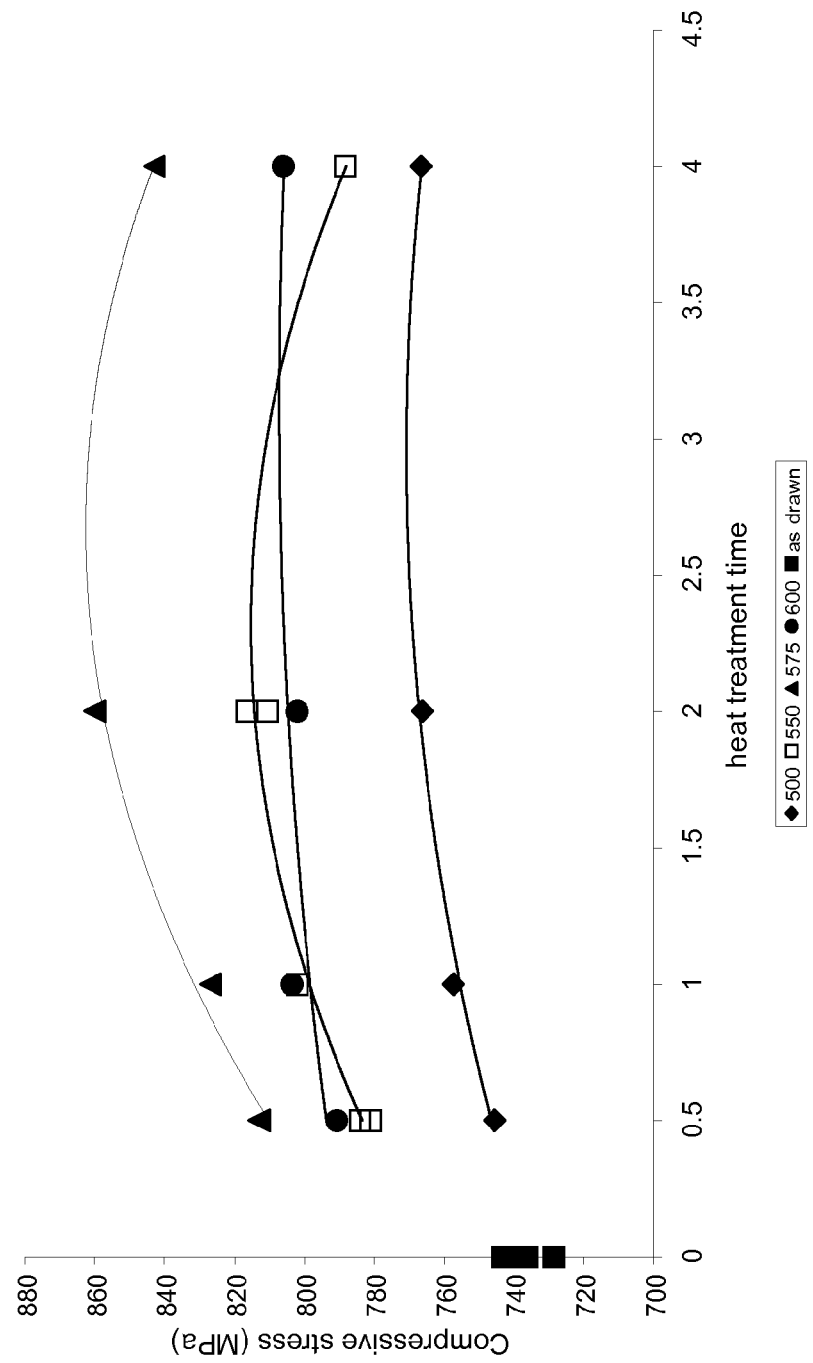
FIG. 2 is a plot of compressive stress as a function of heat treatment time.

In the course of investigating the rates of structural equilibration at temperatures below the annealing point, it has been discovered that the compressive stress increased for glasses that had been heat treated for short periods of time at temperatures below the annealing point, as described hereinabove. In a non-limiting example, alkali aluminosilicate glasses (nominal composition: 66.02 wt % $SiO_2$; 13.62 wt % $Al_2O_3$; 13.73 wt % $Na_2O$; 1.73 wt % $K_2O$; 3.95 wt % MgO; 0.45 wt % CaO; 0.44 wt % SnO2; 0.02 wt % $Fe_2O_3$) were heat treated at either 500° C., 550° C., 575° C., or 600° C. for times ranging from 0.5 hour to 4.0 hours (0.5, 1, 2, and 4 hours). The annealing point of the glass is about 609° C. Following heat treatment, the samples were ion exchanged at 410° C. for 8 hours in a molten salt bath comprising 99.4 wt % $KNO_3$ and 0.6 wt % $NaNO_3$. Compressive stress is plotted in FIG. 2 as a function of heat treatment time for the samples that were heat treated at each of the four temperatures. For comparison, compressive stresses for fusion drawn glass samples that ion exchanged under the same conditions as described above but were not subjected to heat treatment prior to ion exchange are also plotted in FIG. 2. These samples are labeled "as drawn" and plotted at heat treatment time of zero in FIG. 2. The heat treatment at temperatures below the annealing point ($T_g$) significantly enhances compressive stress relative to the as-drawn glass. In addition, the compressive stress for samples heat treated at 575° C. and 550° C. go through substantial maxima, resulting in compressive stresses that are higher than those obtained from fully annealed glass held at 600° C., which is near the annealing point ($T_g$) of the glass.

Figure 3:
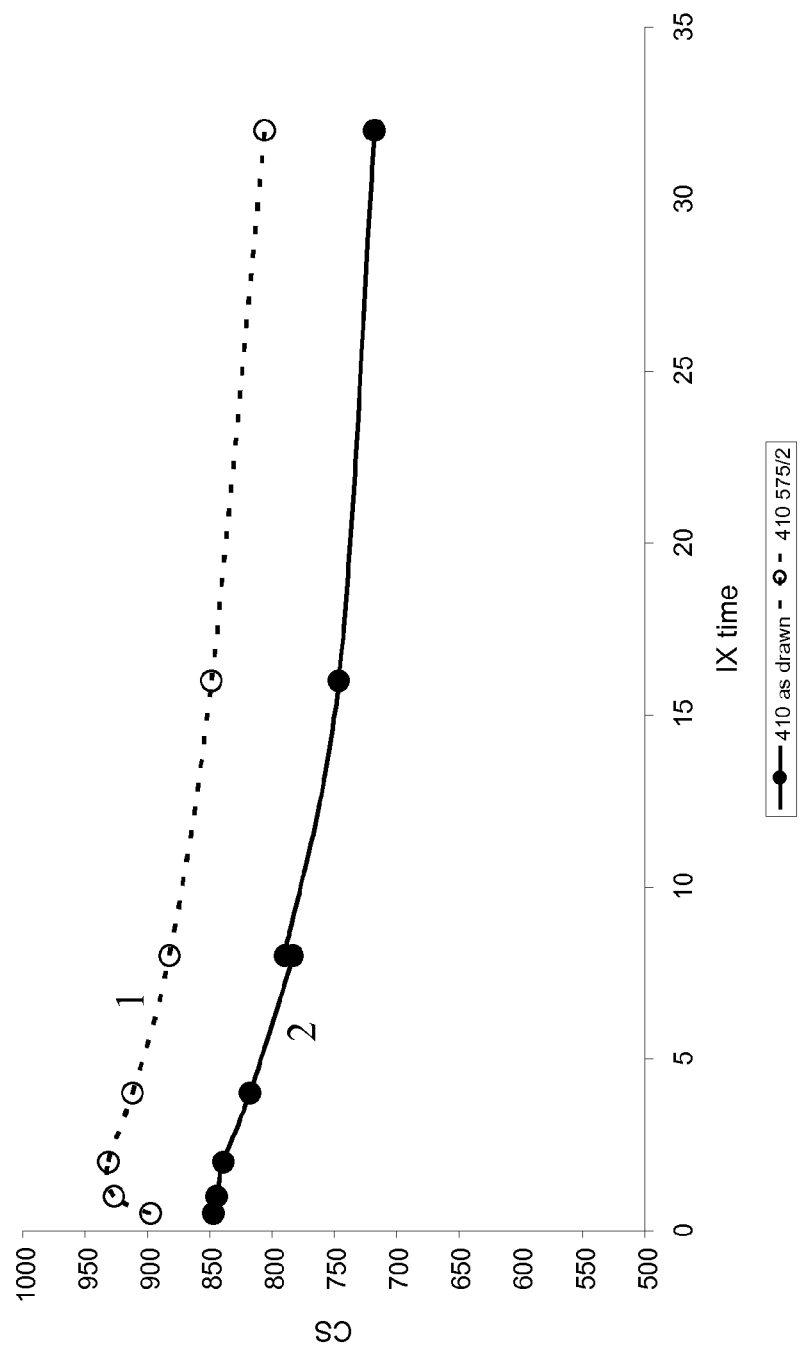
FIG. 3 is a plot of compressive stress as a function of ion exchange time.

The increase in compressive stress provided by the sub-$T_g$ heat treatments described herein is unaffected by the duration of subsequent ion exchange. Compressive stress (CS) is plotted as a function of ion exchange time for ion exchanged glass samples that were heat treated at 575° C. for 2 h prior to ion-exchange (line 1 in FIG. 3) and as-drawn glass (line 2 in FIG. 3) that did not undergo sub-$T_g$ heat treatment. The samples plotted in FIG. 3 were ion exchanged in 99.8 wt % $KNO_3$/0.2 wt % $NaNO_3$ for periods ranging from 0.5 hour to 32 hours. The glass samples had the same composition as those samples described hereinabove. The heat treatment increased the compressive stress by about 80-90 MPa across the range of ion-exchange periods. Approximately the same depth of layer is obtained for heat treated glass that was ion exchanged for 10 hours as that obtained for as-drawn glass after 8 hours. The data plotted in FIG. 3 show that while additional ion exchange time results in a slight decrease in compressive stress in the samples that were heat treated, the compressive stress obtained for these samples is still greater than that of as-drawn glass having the same depth of layer.

Figure 4:
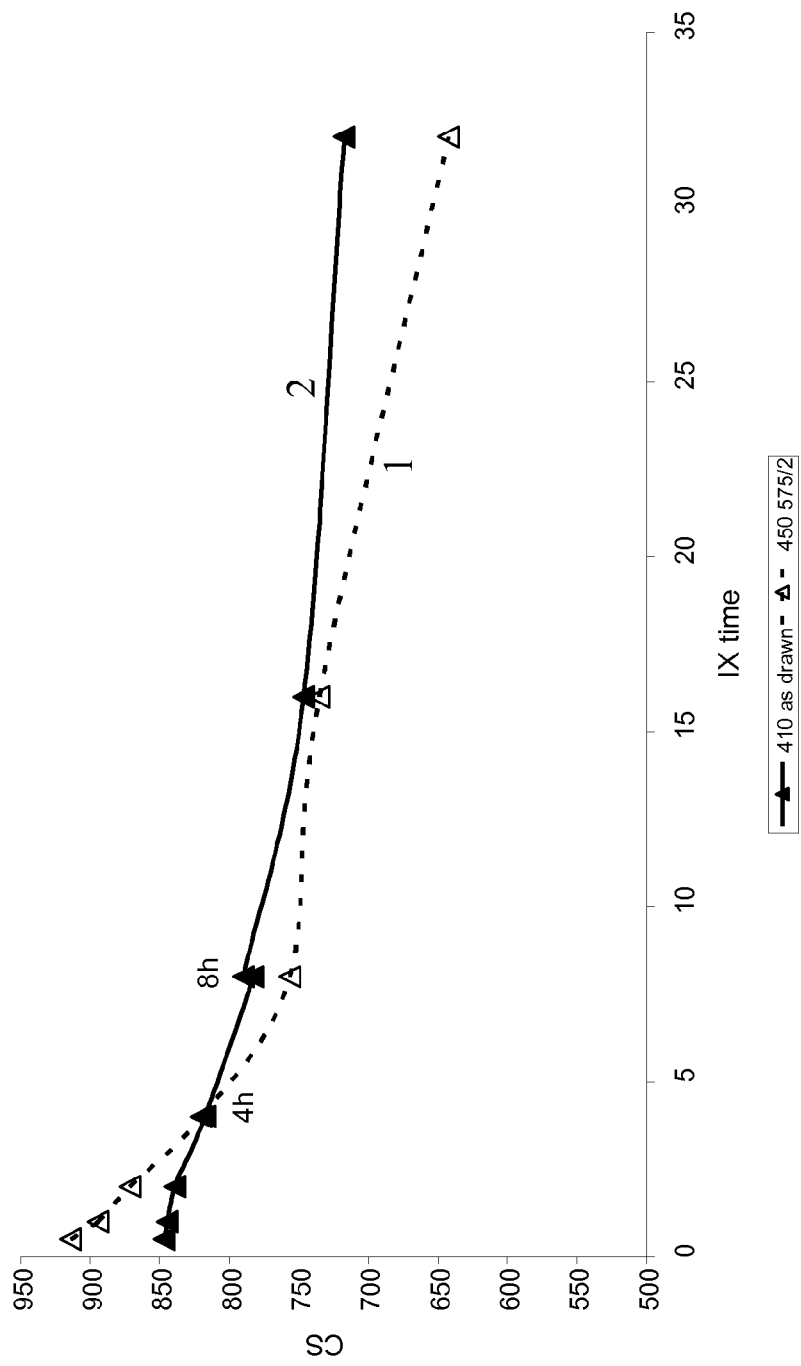
FIG. 4 is a plot of compressive stress for as-drawn and heat-treated glass samples as a function of ion exchange time.

The alteration of the glass structure, particularly by sub-$T_g$ heat treatment, allows the glass to be strengthened at temperatures that are greater than those typically used to strengthen the glass. Furthermore, the heat-treatments described herein may be used to greatly enhance the rate of ion exchange while retaining acceptable compressive stress. Compressive stress for as-drawn and heat-treated glass samples, having the same composition as those samples described hereinabove, is plotted as a function of ion exchange time in FIG. 4. The samples were ion exchanged in a molten salt bath comprising 99.8 wt % $KNO_3$/0.2 wt % $NaNO_3$ for times ranging from 0.5 hour to 32 hours. The heat treated glass samples (1 in FIG. 4) were ion-exchanged at 450° C., whereas the as-drawn glass samples (2 in FIG. 4) were ion-exchanged at 410° C. The depth of the compressive layer obtained after 4 hours at 450° C. for the heat-treated glass is about the same as that obtained for as-drawn glass that was ion-exchanged for 8 hours at 410° C. However, the ion exchanged heat-treated glass still has higher a compressive stress than as-drawn glass that was ion-exchanged at lower temperature for longer time. A higher ion exchange temperature could thus be used to obtain a particular level of compressive stress in a shorter ion exchange time than needed to ion exchange as-drawn glass. In practical terms, this approximately doubles the throughput of a fixed number of ion-exchange baths, and thus facilitates high-volume production of ion-exchanged glass.

Figure 5:
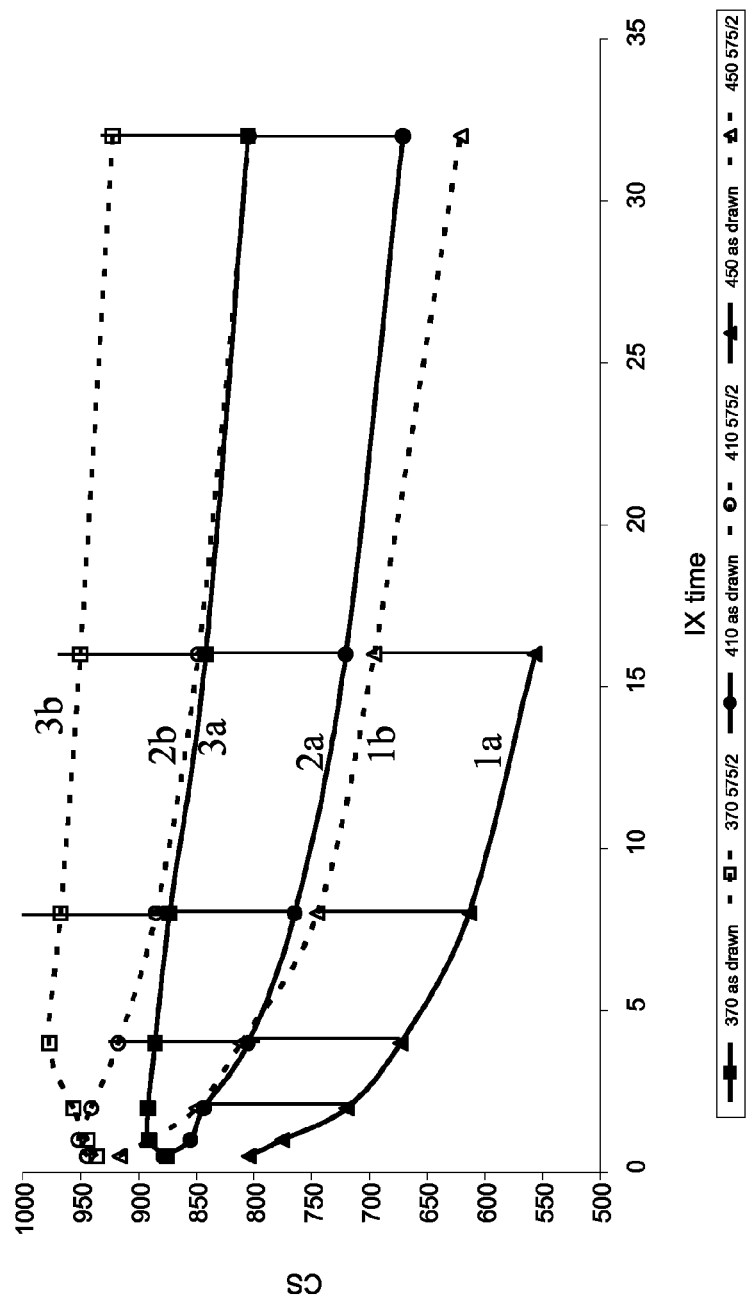
FIG. 5 is a plot of compressive stress for as-drawn and heat-treated glass samples that were ion exchanged at different temperatures as a function of ion exchange time.

The sub-$T_g$ heat treatment described herein improves ion-exchange performance of the glass. FIG. 5 is a plot of compressive stress (CS) as a function of ion exchange (IX) time of glass (nominal composition: 57.64 wt % $SiO_2$; 21.2 wt % $Al_2O_3$; 7.27 wt % $B_2O_3$; 12.78 wt % $Na_2O$; 0.73 wt % $K_2O$; 0.03 wt % MgO; 0.08 wt % CaO; 0.22 wt % $SnO_2$; 0.08 wt % $Fe_2O_3$) that were ion exchanged in a molten salt bath comprising 99.8 wt % $KNO_3$/0.2 wt % $NaNO_3$ at different temperatures (370° C., 410° C., and 450° C.). The closed symbols (1a, 2a, 3a) in FIG. 5 indicate results obtained for as-drawn glass, and the open symbols (1b, 2b, 3b) indicate results obtained for glasses subjected to sub-$T_g$ heat treatment at 575° C. for 2 hours. For all ion-exchange temperatures, the measured compressive stress curves plotted as a function of ion exchange time for the as-drawn and heat-treated samples are nearly parallel to each other. This indicates that the stress relaxation time is not significantly affected by the thermal pre-treatment. The vertical bars in FIG. 5 show the nearly constant offset between as-drawn and heat-treated glass compressive stress. The improved ion-exchange performance due to the sub-$T_g$ heat treatment therefore cannot be explained in terms of lengthening the stress relaxation time, a result that defies the traditional understanding in the field.

Traditional understanding in the field is based on the bulk dynamics of the glass network that provides an average relaxation time. However, in ion-exchangeable glasses there can be different relaxation times associated with the bulk glass behavior as opposed to the local environment around the alkali metal ions. The sub-$T_g$ heat treatments disclosed herein allow for only a subset of the relaxation modes to be activated, thus allowing ion-exchange performance of the glass to be optimized beyond what a fully annealed glass could provide. The importance of this distribution of relaxation times becomes apparent when considering the results in shown in FIG. 2, which shows clear maxima in compressive stress as functions of both heat-treatment temperature and heat-treatment time. These maxima are a direct result of heterogeneous relaxation dynamics and cannot be explained using a conventional single-relaxation time approach.

The compressive stresses obtained by the methods described herein are similar to and, in some instances greater than those obtained for fully annealed glasses that are ion exchanged for the same time at a given temperature. Following the alteration of the glass structure and formation of the compressive layer (e.g., heat treatment and ion exchange), the compressive layer, in some embodiments, has a compressive stress of at least 800 MPa and, in other embodiments, at least 850 MPa. In some embodiments, a compressive stress of at least 800 MPa can be achieved by ion exchanging the glass article at a temperature that is greater than about 410° C. for less than about five hours in a molten salt bath comprising at least about 90% $KNO_3$ and less than about 10 wt % $NaNO_3$.

This allows a particular level of compressive stress to be achieved in a shorter time by strengthening at the higher temperature. In addition, the heat treatment at temperatures below the annealing point of the glass results in less shape distortion than would be observed for fully annealed glass. For example, without any alteration of the glass structure by the heat treatment described herein, a compressive layer may be formed in a glass by ion exchange in a bath comprising about 99.8% $KNO_3$ and about 0.2 wt % $NaNO_3$ at about 410° C. for about eight hours. When the same glass is heat treated prior to ion exchange, as described herein, a compressive layer of equal or greater magnitude is obtainable by ion exchange at higher temperatures for five hours. Alternatively, for a given temperature and time period, a greater compressive stress may be obtained for glass having the altered structure.

In another aspect, a glass article is provided. The glass article has an annealing point and a fictive temperature that is greater than the annealing point. The glass article is ion exchanged and has a surface layer that is under a compressive stress of at least 800 MPa and, in other embodiments, at least 850 MPa. The glass article is formed by the methods described hereinabove. In some embodiments, the glass comprises silica ($SiO_2$), aluminum, and sodium, with at least a portion of the latter two elements being present as the oxides alumina ($Al_2O_3$), and sodium oxide ($Na_2O$). In some embodiments, the glass is an alkali aluminosilicate glass or an alkali aluminoborosilicate glass. The ion exchangeable glass may further comprise phosphorus and alkaline earth metals. The glass article has an altered or restructured surface which, in some embodiments, differs from that of the bulk of the surface. As previously described herein, the altered surface may reflect changes in the lattice dilation coefficient, density, Young's modulus, and/or composition of the glass.

The glass article that is heat treated and ion exchanged according to the methods described herein has a surface compressive stress that is, in some embodiments, at least 5% greater than the surface compressive stress of a glass article of the same composition that has not been so heat treated and has been fully annealed at the annealing point. In some embodiments, the compressive stress is at least 10% greater and, in other embodiments, at least 12% greater than that of a glass of the same composition that has not been so heat treated and has been fully annealed at the annealing point.

The glasses described herein may be used in applications such has, but not limited to: touch screens; protective cover glass for electronic devices such as a hand held communication or entertainment devices, information-related terminals, touch sensor devices, or the like; windshields; appliance enclosures; or architectural elements such as windows, panels, or the like.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making a glass article, the glass article having a surface that is under a compressive stress and comprising an alkali aluminosilicate glass or an alkali aluminoborosilicate glass, wherein the alkali aluminosilicate glass or the alkali aluminoborosilicate glass comprises at least one of $Na_2O$ and $K_2O$, and from about 2 mol % to about 12 mol % $P_2O_5$, the method comprising:
   a. heating the glass article at a first temperature for a time period of less than 4 hours and greater than or equal to 0.5 hours, wherein the glass article has an annealing point and a fictive temperature that is greater than the annealing point, and wherein the first temperature is less than the annealing point; and
   b. ion exchanging the heated glass article in a molten salt bath comprising at least about 90 wt % $KNO_3$ and from about 0.2 wt % to about 10 wt % $NaNO_3$ at a second temperature to achieve a compressive stress layer extending from the surface to a depth of layer and a compressive stress maximum at the surface, wherein the first temperature is greater than the second temperature.

2. The method of claim 1, wherein the first temperature is in a range from about 25° C. to about 100° C. below the annealing point of the glass article.

3. The method of claim 1, wherein the first temperature is between the annealing point and the $10^{17}$ poise temperature of the glass article.

4. The method of claim 1, wherein the compressive stress is at least 800 MPa.

5. The method of claim 4, wherein the step of ion exchanging the glass article comprises ion exchanging the glass article at a temperature that is greater than about 410° C.

6. The method of claim 1, further comprising downdrawing the glass article.

7. A method of strengthening an alkali aluminosilicate glass or an alkali aluminoborosilicate glass, wherein the alkali aluminosilicate glass or the alkali aluminoborosilicate glass comprises at least one of $Na_2O$ and $K_2O$, and from about 2 mol % to about 12 mol % $P_2O_5$, and wherein the alkali aluminosilicate glass or the alkali aluminoborosilicate glass has an annealing point and a fictive temperature that is greater than the annealing point, the method comprising:
   a. heating the alkali aluminosilicate glass or the alkali aluminoborosilicate glass at a first temperature that is less than the annealing point for a time period of less than 4 hours and greater than or equal to 0.5 hours to at least partially restructure a surface of the alkali aluminosilicate glass or the alkali aluminoborosilicate glass; and
   b. creating a compressive stress layer extending from the surface to a depth of layer and a compressive stress maximum at the surface after restructuring the surface, wherein the step of creating the compressive stress comprises ion exchanging the alkali aluminosilicate glass or the alkali aluminoborosilicate glass in a molten salt bath comprising at least about 90 wt % $KNO_3$ and from about 0.2 wt % to about 10 wt % $NaNO_3$ at a second temperature to a depth of layer extending from a surface of the alkali aluminosilicate glass or the alkali aluminoborosilicate glass.

8. The method of claim 7, wherein the first temperature is in a range from about 25° C. to about 100° C. below the annealing point.

9. The method of claim 7, wherein the second temperature is less than the first temperature.

10. The method of claim 9, wherein the second temperature is greater than about 410° C. and less than the first temperature.

11. The method of claim 7, wherein the first temperature is between the annealing point and $10^{17}$ poise temperature of the glass.

12. The method of claim 7, wherein the compressive stress is at least 800 MPa.

13. The method of claim 7, wherein the glass is downdrawn.

* * * * *